United States Patent
Sambati

(10) Patent No.: US 11,684,866 B2
(45) Date of Patent: Jun. 27, 2023

(54) KIT COMPRISING A MOLD AND A POWDER WATER-SENSITIVE MIXTURE FOR MAKING A BIJOU THROUGH SAID MOLD

(71) Applicant: MEMENTO S.r.l., Lecce (IT)

(72) Inventor: Andrea Luigi Sambati, Lecce (IT)

(73) Assignee: MEMENTO S.R.L., Lecce (IT)

( * ) Notice: Subject to any disclaimer, the term of this patent is extended or adjusted under 35 U.S.C. 154(b) by 258 days.

(21) Appl. No.: 16/770,227

(22) PCT Filed: Dec. 6, 2018

(86) PCT No.: PCT/IB2018/059713
§ 371 (c)(1),
(2) Date: Jun. 5, 2020

(87) PCT Pub. No.: WO2019/111201
PCT Pub. Date: Jun. 13, 2019

(65) Prior Publication Data
US 2020/0391131 A1 Dec. 17, 2020

(30) Foreign Application Priority Data

Dec. 7, 2017 (IT) .................. 202017000141532

(51) Int. Cl.
*B29C 43/36* (2006.01)
*C08L 29/04* (2006.01)
(Continued)

(52) U.S. Cl.
CPC ........... *A63H 33/001* (2013.01); *B29C 43/36* (2013.01); *C08L 29/04* (2013.01); *B29K 2029/04* (2013.01);
(Continued)

(58) Field of Classification Search
None
See application file for complete search history.

(56) References Cited

U.S. PATENT DOCUMENTS 3,934,809 A * 1/1976 Fox .................... B28B 7/20
249/117
3,937,438 A * 2/1976 Fox .................... B28B 7/06
249/117
(Continued)

FOREIGN PATENT DOCUMENTS

EP 0596194 A1 5/1994
FR 2339422 A1 8/1977
(Continued)

OTHER PUBLICATIONS

FR-3009503-A1 (Demorest) Aug. 2013 (online machine translation), [Retrieved on Mar. 16, 2022]. Retrieved from: Espacenet (Year: 2013).*
(Continued)

*Primary Examiner* — Alison L Hindenlang
*Assistant Examiner* — Andrés E. Behrens, Jr.
(74) *Attorney, Agent, or Firm* — Volpe Koenig

(57) ABSTRACT

The present invention relates to a kit comprising a mould (1; 101; 201) for kids and a powder water-sensitive mixture (M) for making a bijou through the mould, wherein the mould (1; 101; 201) comprises at least one body (2; 102) having a lower face, an opposing upper face (3) and a side wall (4) comprised between the lower face and the upper face (3), and at least one cavity (5) opened on the upper face (3) and equipped with a bottom (6), wherein the at least one body (2; 102) is of a flexible and/or deformable material, and wherein the mixture comprises polyvinyl alcohol, guar gum and ethylene vinyl acetate.

16 Claims, 5 Drawing Sheets

(51) Int. Cl.
  B29C 39/36 (2006.01)
  B29C 33/44 (2006.01)
  B29C 33/50 (2006.01)
  A63H 33/00 (2006.01)
  B29C 43/18 (2006.01)
  B29C 39/10 (2006.01)
  B29C 33/10 (2006.01)
  B29K 29/00 (2006.01)
  B29L 31/52 (2006.01)

(52) U.S. Cl.
  CPC ....... *B29L 2031/52* (2013.01); *C08L 2205/03* (2013.01)

(56) References Cited

U.S. PATENT DOCUMENTS

| | | | | |
|---|---|---|---|---|
| 5,506,280 | A * | 4/1996 | Miller | C08L 29/04 524/557 |
| 6,444,728 | B1 * | 9/2002 | Yuyama | C08L 33/12 524/378 |
| 11,192,043 | B2 * | 12/2021 | Sambati | B29C 39/26 |
| 2009/0072436 | A1 * | 3/2009 | Dean | B29D 35/128 264/223 |
| 2012/0142849 | A1 | 6/2012 | Cordova | |

FOREIGN PATENT DOCUMENTS

| | | | |
|---|---|---|---|
| FR | 3009503 A1 * | 2/2015 | .......... A63H 33/001 |
| FR | 3009503 A1 | 2/2015 | |

OTHER PUBLICATIONS

Wikipedia contributors. "Clay-Water Interaction." Wikipedia, Nov. 21, 2016, https://web.archive.org/web/20161121044640/https://en.wikipedia.org/wiki/Clay%E2%80%93water_interaction (Year: 2016).*

"Latex—Wikipedia, the Free Encyclopedia." Wikipedia, Mar. 2, 2016, web.archive.org/web/20160302114353/https://en.wikipedia.org/wiki/Latex. (Year: 2016).*

"How To Make a 2 Piece Silicone Rubber Mold | Mold Making Tutorial."YouTube, Jan. 20, 2011, www.youtube.com/watch?v=FQ1A7ZjTsx8. (Year: 2011).*

"How To Cast Resin Using Smooth-Cast® 325 Clear ColorMatch Urethane Resin." YouTube, uploaded by Smooth On Inc., Jan. 20, 2011, www.youtube.com/watch?v=XPezK5RHgcc. (Year: 2011).*

FR-3009503-A1 (Demorest) Aug. 2013 (online machine translation), [Retrieved on Mar. 17, 2022], Retrieved from: Espacenet (Year: 2013).*

* cited by examiner

KIT COMPRISING A MOLD AND A POWDER WATER-SENSITIVE MIXTURE FOR MAKING A BIJOU THROUGH SAID MOLD

FIELD OF THE INVENTION

In its more general aspect the present invention relates to the technical sector of toys and specifically relates to a mould for kids, to a powder water-sensitive mixture for making a bijou through the afore said mould and to a kit comprising the afore said mould and the afore said powder mixture.

STATE OF THE ART

As it is known the toy sector provides moulds to be used with water-sensitive powders for making articles having compact and gummy consistency.

Although advantageous, the moulds provided in the known art are not free from drawbacks among which the most relevant, particularly for a kid, is the difficulty of extraction of the article formed in the mould therefrom.

The moulds for kids provided in the known art have in fact a rigid structure made of a hard material and, thus, in order to ease the extraction of the formed article, a proper tool, an extractor, is often provided, which is however still hard to manipulate for a kid.

Also the water-sensitive powders to be used with the afore said moulds, which are provided in the known art, are not free from drawbacks.

The afore said powders, for example, also contain, among other substances, polyvinyl chloride, whose use should be avoided in products intended for kids when still in powder or finely granulated form.

SUMMARY OF THE INVENTION

It is an object of the present invention to provide a mould for kids having structural and/or functional characteristics such as to overcome the drawbacks mentioned above with reference to the known art.

It is a further object of the present invention to provide a powder water-sensitive mixture to be used with the afore said mould, having characteristics such as to overcome the drawbacks mentioned above with reference to the known art.

It is a further object of the present invention to provide a kit for kids comprising the afore said mould and the afore said mixture, thus a kit of the afore said type provided with a particular convenience of use and application.

In accordance with the invention the afore said objects are achieved by a mould for kids comprising at least one body having a lower face, an opposing upper face and a side wall comprised between the afore said lower face and the afore said upper face, and at least one cavity opened on the afore said upper face and equipped with a bottom, wherein the afore said at least one body is of a flexible and/or deformable material, specifically a soft material.

Preferably the afore said mould is equipped with at least one first passage extended from the afore said at least one cavity to the afore said side wall, wherein the afore said at least one first passage is a through-hole, a groove opened in the afore said upper face, a notch opened in the afore said upper face or a combination thereof.

Preferably the afore said mould is equipped with a pair of opposing passages extended from the afore said at least one cavity to the afore said side wall, wherein each one of the afore said opposing passages is a through-hole, a groove opened in the afore said upper face, a notch opened in the afore said upper face or a combination thereof.

Preferably the afore said mould is equipped with a plurality of openings extended from the afore said bottom of the afore said at least one cavity to the afore said lower face.

Preferably the afore said at least one body is made of a single piece.

Preferably the afore said mould comprises a second body removably combined with the afore said at least one body (first body), wherein the afore said second body is a lid for closing/opening the afore said at least one cavity of the afore said at least one body, wherein the afore said lid is preferably equipped with a plurality of through openings, or wherein the afore said second body is substantially equal to the afore said at least one body (first body), in this second case the afore said mould being a bivalve mould.

Preferably the afore said flexible and/or deformable material is silicone, a silicone-based material, or a rubber material.

In accordance with the invention the afore said objects are also achieved by a powder water-sensitive mixture for making a bijou of gummy material, comprising polyvinyl alcohol (PVOH), guar gum ($C_{18}H_{30}O_{15}$) and ethylene vinyl acetate (EVA).

Preferably the afore said mixture comprises polyvinyl alcohol in an amount between 80 wt % and 90 wt % to the total weight of the mixture, guar gum in an amount between 0.5 wt % and 10 wt % to the total weight of the mixture and ethylene vinyl acetate in an amount between 4 wt % and 15 wt % to the total weight of the mixture.

Preferably the afore said mixture comprises one or more food dyes and/or sodium tetraborate.

Preferably the afore said mixture comprises polyvinyl alcohol in an amount equal to 85 wt % to the total weight of the mixture, guar gum in an amount equal to 5 wt % to the total weight of the mixture, ethylene vinyl acetate in an amount equal to 9 wt % to the total weight of the mixture and a food dye in an amount equal to 1 wt % to the total weight of the mixture.

In accordance with the invention the afore said objects are also achieved by a kit comprising a mould for kids of the afore said type and a powder water-sensitive mixture of the afore said type for making a bijou through the afore said mould.

Preferably the afore said kit comprises closing and/or hooking means selected from the group including yarns, closed-ring-like lines, clips, rings, open rings, tweezers, hooks.

In accordance with the invention it is therefore provided a mould for kids to be used with a powder water-sensitive mixture, which is structurally and functionally simple, cheap to implement, which does not require particular manual skill to be used and specifically for the extraction of the bijou formed therein with the afore said mixture, it being able to be bended and/or deformed also upon a gentle pressure or force as the ones a kid can apply, while the afore said mixture is simple and safe to be used, not containing polyvinyl chloride and requiring about 3-4 minutes in order to form the desired bijou once wet and preferably subjected to a gentle manual pressure.

BRIEF DESCRIPTION OF THE FIGURES

Further characteristics and advantages of the invention will be more evident by the review of the following specification of some preferred, but not exclusive, embodiments depicted for illustration purposes only and without limitation, with the aid of the attached drawings, wherein.

DETAILED DESCRIPTION OF THE INVENTION

Figure 1:
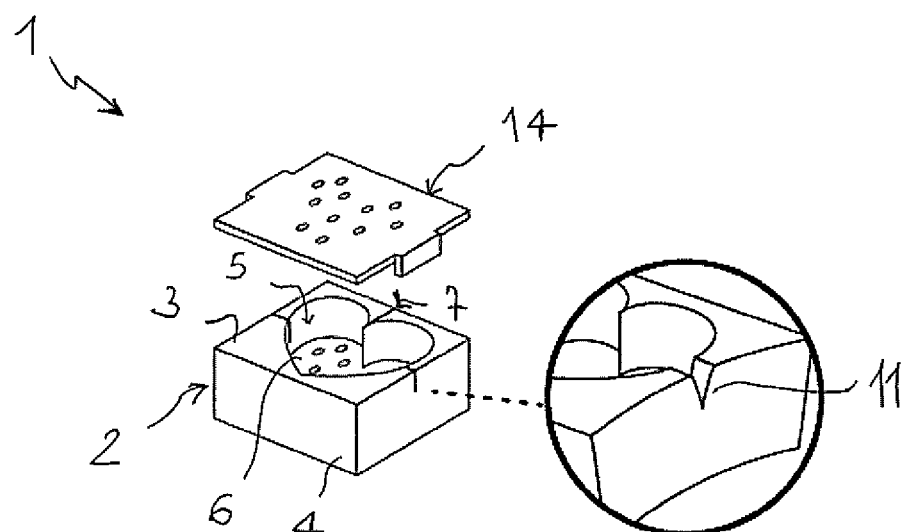
FIG. 1 shows, in separate parts, a perspective view with respective enlarged detail of a mould for kids, in accordance with the present invention.
Figure 2:
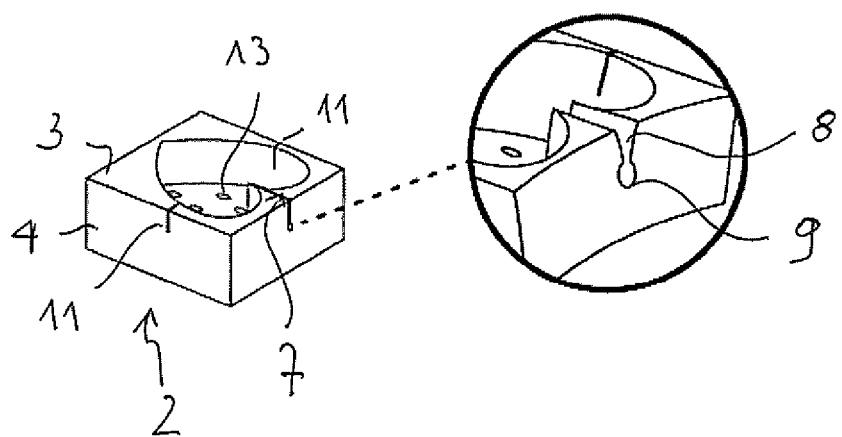
FIG. 2 shows a different perspective view of a detail of the mould of FIG. 1, with a further respective enlarged detail.
Figure 3:
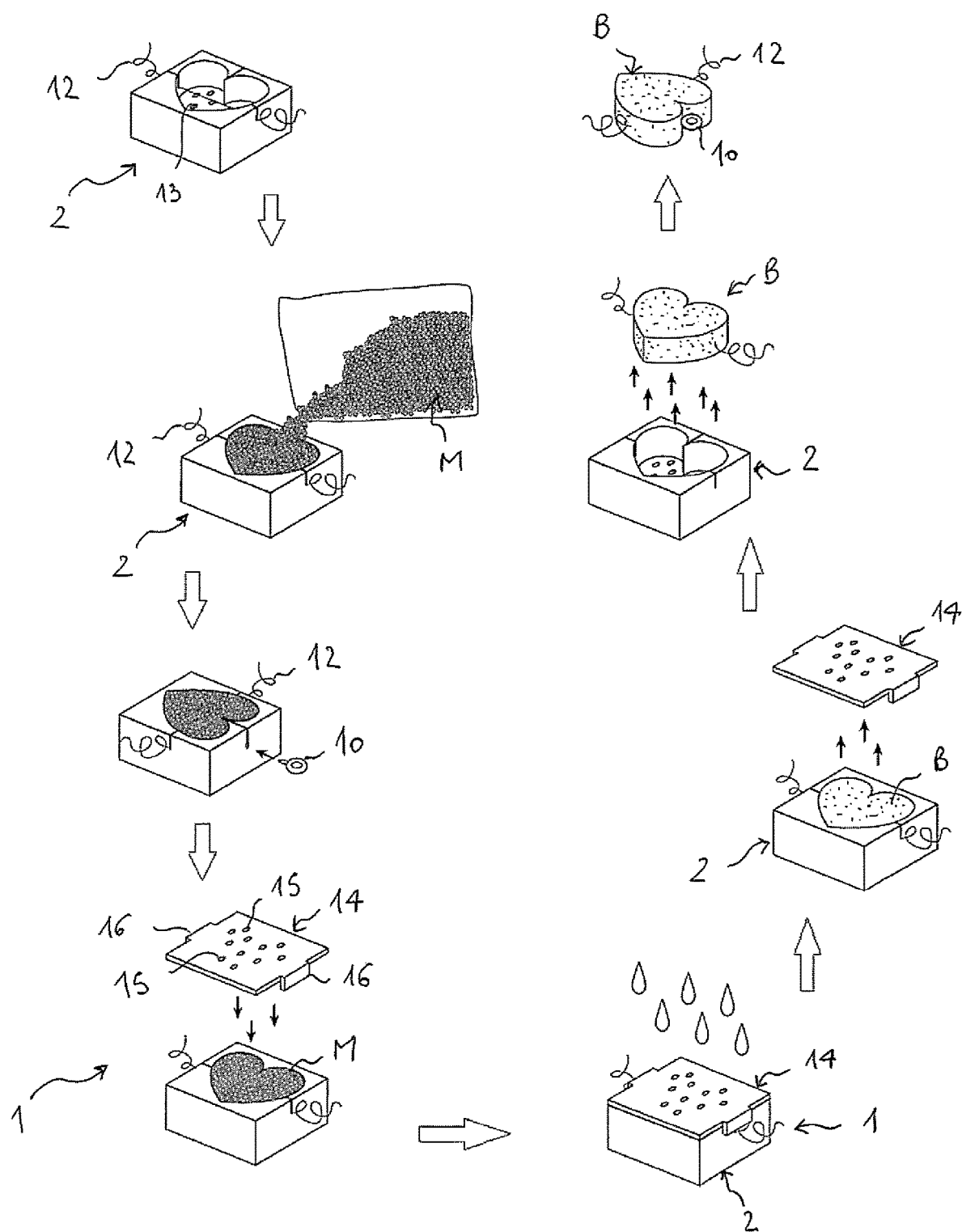
FIG. 3 shows some perspective vies of the mould of FIG. 1 during some steps of its use in conjunction with a powder water-sensitive mixture and to closing and/or hooking means for implementing a bijou, in accordance with the present invention.

Referring to FIGS. 1-3, a mould for kids in accordance with the present invention for making decorative objects of the type, for instance, of wristbands, bracelets, necklaces, small necklaces, clips, pins, pendants, rings and similar bijoux, is overall denoted with numeral 1.

The mould 1 comprises a body 2 also identified as first body and having a lower face, an opposing upper face 3 and a side wall 4 comprised between the lower face and the upper face 3, wherein the body 2 comprises a cavity 5 opened on the upper face 3 and equipped with a bottom 6.

In accordance with the invention, the body 2 is of a flexible and/or deformable material, advantageously a silicone, a silicone-based material, a rubber material or a similar material which allows some deformation by the bending or crushing thereof.

Furthermore, still in accordance with the invention and with the example of FIGS. 1-3, the body 2 is made in a single piece.

Again as regard to the body 2, it has to be added that it is preferably equipped with a first passage 7 extending from the cavity 5 to the side wall 4, wherein the first passage can be a through-hole, a groove opened on the upper face 3, a notch opened on the upper face 3 or a combination thereof, and in accordance with the example of the afore said FIGS. 1-3, the first passage 7 is formed by a notch 8 opened on the upper face 3 of the body 2 combined with a through-hole 9 extended at the bottom of the notch 8.

It has to be noted that in the combination of a notch and a through-hole in the implementation of the afore said first passage, alternatively to what above, the through-hole can be arranged on top of the notch or along the notch, these embodiments not being illustrated in the figures.

The first passage allows the mould to be combined with closing and/or hooking means selected from the group including yarns, closed-ring-like lines, clips, rings, open rings, eyelets, tweezers, hooks, and in particular in the example of FIG. 3 allows an eyelet 10 to be combined, for making a respective bijou B comprising such closing or hooking means, as it will be more evident in the following.

Still it has to be mentioned that the mould 1 and in particular the body 2 is provided with a pair of opposing passages 11 or second passages, which extend from the cavity 5 to the side wall 4, wherein each passage of the opposing passages is a through-hole, a groove opened in the upper face, a notch opened in the upper face or a combination thereof, and in accordance with the example of FIGS. 1-3, each one of the opposing passages 11 is substantially formed by a notch opened on the upper face 3 of the body 2.

The opposing passages allow the mould to be combined with closing and/or hooking means selected from the group including yarns, closed-ring-like lines, clips, rings, open rings, eyelets, tweezers, hooks, and in particular in the example of FIG. 3 they allow a yarn 12 to be combined, for making a respective bijou B comprising such closing or hooking means, as it will be more evident in the following.

In accordance with the example of FIGS. 1-3, the mould 1 comprises the first passage 7 and the opposing passages 11, but it is understood that in accordance with the invention the present mould can comprise only one first passage of the afore mentioned type, or opposing passages only, i.e. the afore said second passages as afore considered, wherein each one of the passages can consist of a through-hole, a groove opened in the upper face of the body 2, a notch opened in the upper face of the body 2 or a combination thereof.

Still in accordance with the example of FIGS. 1-3, the mould 1 is equipped with a plurality of openings 13 extended from the bottom 6 of the cavity 5 to the afore said lower face of the body 2, without however excluding the possibility of providing a lower face free from through openings.

Still in accordance with the example of FIGS. 1-3, the mould 1 comprises a second body 14 removably combinable with the body 2, wherein the second body can be a lid for opening/closing the cavity 5 of the body 2, or wherein the second body can be substantially similar or equal to the body 2, in this second case the present mould being a so-called bivalve mould.

Specifically, in the case of the example of FIGS. 1-3, the second body 14 is a lid provided with through-holes 15 having side portions 16 hooking to the body 2.

The second body 14 can be of the same material as the body 2 or of a different material, always soft thus flexible and/or deformable, or substantially rigid.

For the implementation of the desired bijou, the present invention also provides a powder water-sensitive mixture M to be used with the mould 1.

The mixture M essentially comprises polyvinyl alcohol (PVOH), guar gum ($C_{18}H_{30}O_{15}$) and ethylene vinyl acetate (EVA).

Preferred amounts in the afore said mixture M are polyvinyl alcohol between 80 wt % and 90 wt % to the total weight of the mixture, guar gum between 0.5 wt % and 10 wt % to the total weight of the mixture and ethylene vinyl acetate between 4 wt % and 15 wt % to the total weight of the mixture, which even more preferably can also comprise one or more food dyes and/or sodium tetraborate.

A particularly preferred mixture comprises polyvinyl alcohol in an amount equal to 85 wt % to the total weight of the mixture, guar gum in an amount equal to 5 wt % to the total weight of the mixture, ethylene vinyl acetate in an amount equal to 9 wt % to the total weight of the mixture and a food dye in an amount equal to 1 wt % to the total weight of the mixture.

In accordance with what above, the mould 1, the afore said closing and/or hooking means selected from the group including yarns, closed-ring-like lines, clips, rings, open rings, eyelets, tweezers, hooks and the mixture M constitute a kit according to the present invention for making bijoux of gummy and compact material of the type of wristbands, bracelets, necklaces, small necklaces, clips, pins, pendants, rings and the like.

In such regard the mould 1 allows making the bijou B heart-shaped, but it is understood that with the present invention, bijoux having various shapes can be made depending on the mould cavity, or cavities if they are in a larger number, which therefore can be of any shape, including a circular crown shape.

Figure 4:
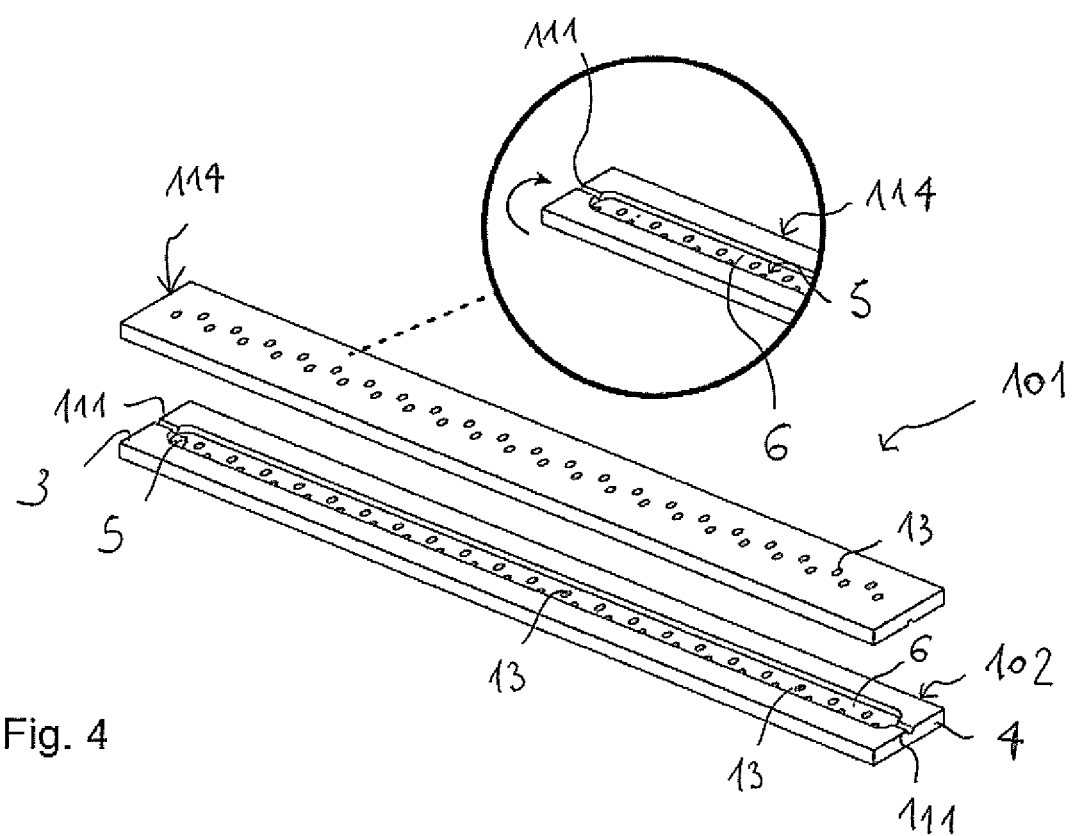
FIG. 4 shows, in separate parts, a perspective view of a mould for kids with a respective enlarged and rotated detail, in accordance with an embodiment variation of the present invention.
Figure 5:
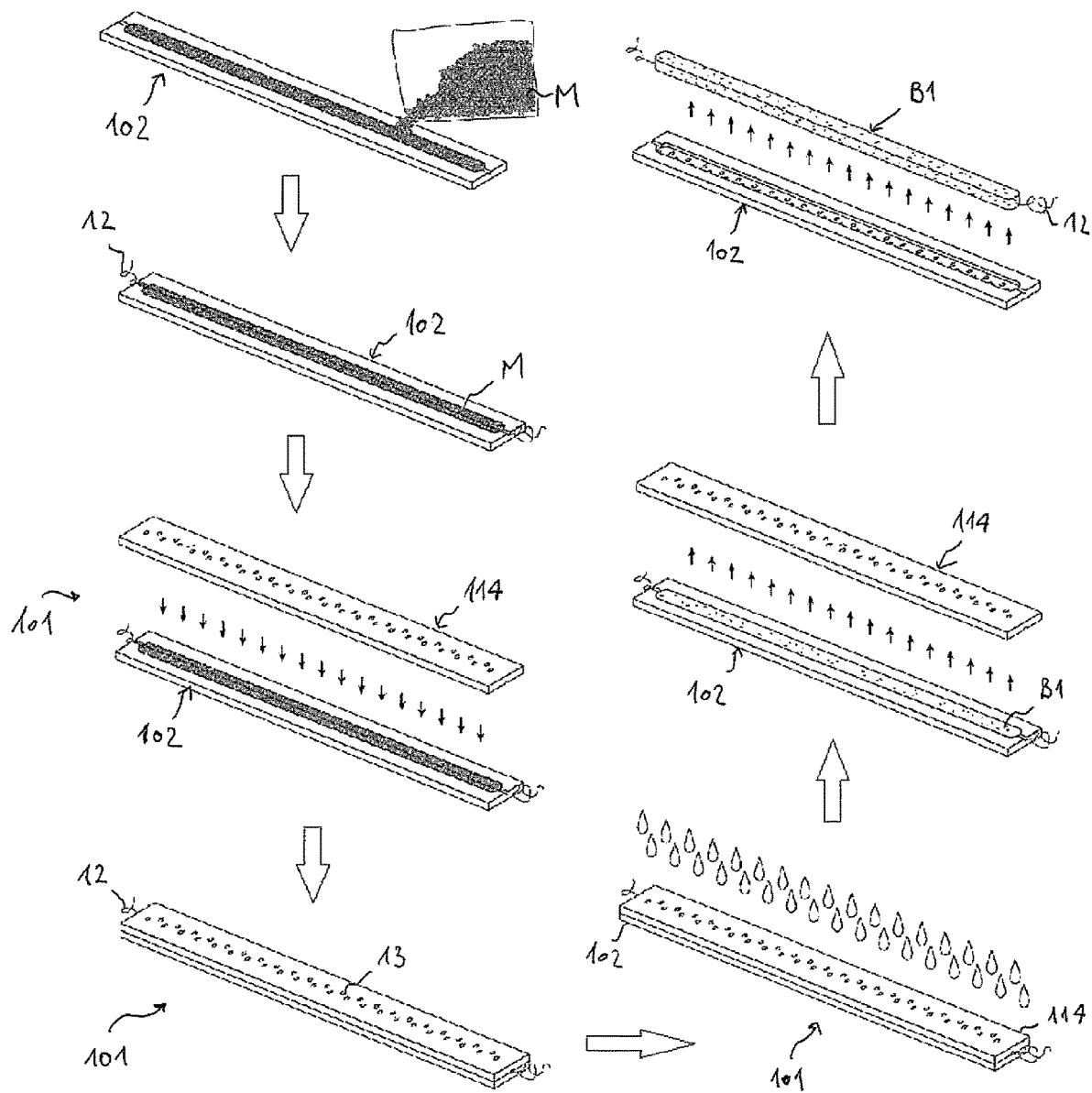
FIG. 5 shows some perspective vies of the mould of FIG. 4 during some steps of its use in conjunction with a powder water-sensitive mixture and to closing and/or hooking means for implementing a bijou, in accordance with the present invention.

In reference to FIGS. 4 and 5 an embodiment variation is shown of the mould for kids according to the present invention, wherein parts structurally and functionally corresponding to those of the afore described mould 1 keep the same reference numbers as used above.

In detail, in the example of FIGS. 4 and 5 a mould 101 is shown and comprises an elongated body 102, also identified as first body, having a lower face, an opposing upper face 3 and a side wall 4 comprised between the lower face and the upper face 3, wherein the body 102 comprises a cavity 5 elongated and opened on the upper face 3, which is equipped with a bottom 6.

As above described and in accordance with the invention, the body 102 is of a flexible and/or deformable, thus soft, material, advantageously a silicone, a silicone-based material, a rubber material or a similar material which allows some deformation by the bending or crushing thereof.

Furthermore, still in accordance with the invention and with the example of FIGS. 4-5, the body 102 is made in a single piece.

Still as regard to the body 102, it has to be added that it is preferably equipped with opposing passages 111, in particular two passages, which extend from the cavity 5 to the side wall 4, wherein each one of the opposing passages can be a through-hole, a groove opened on the upper face 3, a notch opened on the upper face 3 or a combination thereof, and in accordance with the example of FIGS. 4-5, each one of the opposing passages 111 can take the form of a groove opened on the upper face 3 of the body 102.

The opposing passages 111 allow the mould to be combined with closing and/or hooking means selected from the group including yarns, closed-ring-like lines, clips, rings, open rings, eyelets, tweezers, hooks, and in particular in the example of FIGS. 4 and 5 allow a yarn 12 to be combined, for making a respective bijou B1 comprising such closing or hooking means, as it will be more evident in the following.

Still in accordance with the example of FIGS. 4-5, the mould 101 is equipped with a plurality of openings 13 extended from the bottom 6 of the cavity 5 to the afore said lower face of the body 102, without however excluding the possibility of providing a lower face free from through openings.

Still in accordance with the invention, the mould 101 comprises a second body 114 removably combinable with the body 102, wherein the second body can be a lid for closing/opening the cavity 5, or wherein the second body can be substantially similar or equal to the body 102, in this second case the mould being a so-called bivalve mould as illustrated in the example of FIGS. 4-5.

In detail, the second body 114 is identical to the body 102 to which description reference is made, without however excluding the possibility of providing a second body similar to the body 102 and comprising only some of the characteristics of the latter.

In the example of FIGS. 4-5, the second body thus comprises two opposing passages 111 which take the form of two respective grooves and a cavity 5 on whose bottom 6 a plurality of openings 13 are arranged.

Similarly to what described above, the mould 101 in conjunction with the above illustrated mixture M and preferably with the still above illustrated closing and/or hooking means, and to whose respective descriptions reference is made, compose a kit according to the present invention for making bijoux of gummy material of the type of wristbands, bracelets, necklaces, small necklaces, clips, pins, pendants, rings and the like.

Figure 6:
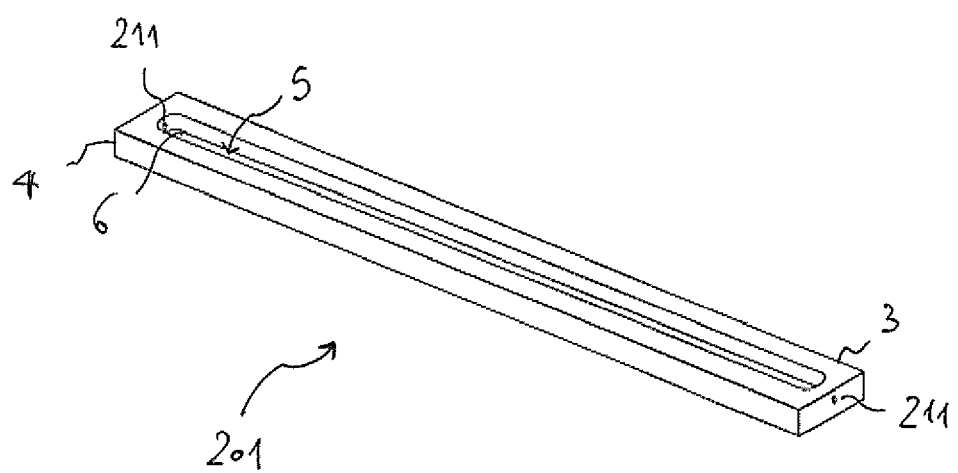
FIG. 6 shows a perspective view of a mould for kids in accordance with a further embodiment variation of the present invention.

With reference to the example of FIG. 6 a further embodiment variation is shown of the mould according to the present invention, wherein parts structurally and functionally corresponding to those of the afore described moulds 1 and 101 keep the same reference numbers as used above.

In detail, in the example of FIG. 6 a mould 201 is shown and comprises a single elongated body having a lower face, an opposing upper face 3 and a side wall 4 comprised between the lower face and the upper face 3, wherein the body comprises a cavity 5 elongated and opened on the upper face 3, which cavity is equipped with a bottom 6, in this case free from holes.

In this case also two opposing passages 211 are provided that extend from the cavity 5 to the side wall 4, wherein each one of the opposing passages is a through-hole.

The opposing passages 211 allow the mould 201 to be combined with closing and/or hooking means selected from the group including yarns, closed-ring-like lines, clips, rings, open rings, eyelets, tweezers, hooks, not illustrated in the example of FIG. 6.

In accordance with the invention, the mould 201 is of a flexible and/or deformable material, advantageously a silicone, a silicone-based material, a rubber material or a similar material which allows some deformation by the bending or crushing thereof.

In accordance with the invention, the mould 201 in conjunction with the above illustrated mixture M and preferably with the afore said closing and/or hooking means, and to whose respective descriptions reference is made, compose a kit according to the present invention for making bijoux of gummy material of the type of wristbands, bracelets, necklaces, small necklaces, clips, pins, pendants, rings and the like.

With the mould according to the present invention, the desired bijou is obtained through few simple operations, as illustrated in the example of FIG. 3 for the bijou B and in the example of FIG. 5 for the bijou B1.

In practice, a proper amount of mixture M is placed in the cavity 5 of the body of the mould (first body), before or after combining the afore said closing and/or hooking means with the same body, as the case may be; subsequently the mixture M is wet (as illustrated by the water drops in the afore said FIGS. 3 and 5) and possibly pressed, possibly by closing the cavity 5 with the second body of the mould, if any, thus the powder water-sensitive mixture within few minutes, typically 3-4 minutes, turns into a gummy and compact piece having the desired shape, which can be easily extracted from the mould thanks to the flexibility of the first body of the mould itself, after removing the second body of the mould, if any.

The mixture can be wet once arranged in the mould with a proper amount of water, or the mixture can be wet in the mould also with an excess of water and it is again possible to immerse the mould containing the powder mixture in water and then draw it out from the water, the powder mixture substantially absorbing only the water required to turn into a compact and gummy material.

The advantages of the present invention already became evident throughout the afore reported description can be summarized by underlining that a kit is provided for making decorative objects of the type for instance of wristbands, bracelets, necklaces, small necklaces, clips, pins, pendants, rings and similar bijoux, specifically a kit comprising a mould for kids and a powder water-sensitive mixture to be used with the mould, which is structurally and functionally simple, cheap, and does not require any particular manual skill to be used and that is safe as well.

In order to meet incidental and specific requirements, several variations and modifications could be made by a field technician to the illustrated and described embodiments of present invention, provided that all are included in the scope of protection of the invention as defined by the following claims.

The invention claimed is:

1. A kit comprising a mold (1; 101; 201) and a powder water-sensitive mixture (M) for making a bijou via said mold (1), wherein said mold comprises at least one body (2; 102) having a lower face, an opposing upper face (3) and a side wall (4) comprised between said lower face and said upper face (3), and at least one cavity (5) opened on said upper face (3) and equipped with a bottom (6), wherein said at least one body (2; 102) is of a flexible and/or deformable material, and wherein said water-sensitive mixture comprises polyvinyl alcohol, guar gum and ethylene vinyl acetate, and wherein said water-sensitive mixture comprises polyvinyl alcohol in an amount between 80 wt % and 90 wt % to the total weight of the water-sensitive mixture, guar gum in an amount between 0.5 wt % and 10 wt % to the total weight of the water-sensitive mixture and ethylene vinyl acetate in an amount between 4 wt % and 15 wt % to the total weight of the water-sensitive mixture.

2. The kit according to claim 1, wherein said at least one body (2, 102) is equipped with at least one first passage (7) extended from said at least one cavity (5) to said side wall (4), wherein said at least one first passage (7) is a through-hole (9), a groove opened in said upper face (3), a notch (8) opened in said upper face (3) or a combination thereof.

3. The kit according to claim 1, wherein said at least one body (2, 102) is equipped with a pair of opposing passages (11; 111; 211) extended from said at least one cavity (5) to said side wall (4), wherein each of said opposing passages is a through-hole, a groove opened in said upper face, a notch opened in said upper face or a combination thereof.

4. The kit according to claim 1, wherein said at least one body is equipped with a plurality of openings (13) extended from said bottom (6) of said at least one cavity (5) to said lower face.

5. The kit according to claim 1, further comprising a second body (14; 114) removably combined with said at least one body, wherein said second body is a lid for closing/opening said at least one cavity of said at least one body and comprises a plurality of through openings (15), or wherein said second body is substantially equal to said at least one body said mold being a bivalve mold.

6. The kit according to claim 1, wherein said flexible and/or deformable material is silicone, a silicone-based material, or a rubber material.

7. The kit according to claim 1, wherein said water-sensitive mixture comprises one or more food dyes and/or sodium tetraborate.

8. A kit comprising a mold (1; 101; 201) and a powder water-sensitive mixture (M) for making a bijou via said mold (1), wherein said mold comprises at least one body (2; 102) having a lower face, an opposing upper face (3) and a side wall (4) comprised between said lower face and said upper face (3), and at least one cavity (5) opened on said upper face (3) and equipped with a bottom (6), wherein said at least one body (2; 102) is of a flexible and/or deformable material, and wherein said water-sensitive mixture comprises polyvinyl alcohol, guar gum and ethylene vinyl acetate, wherein said water-sensitive mixture comprises polyvinyl alcohol in an amount equal to 85 wt % to the total weight of the mixture, guar gum in an amount equal to 5 wt % to the total weight of the water-sensitive mixture, ethylene vinyl acetate in an amount equal to 9 wt % to the total weight of the mixture and a food dye in an amount equal to 1 wt % to the total weight of the water-sensitive mixture.

9. The kit according to claim 1, further comprising closing and/or hooking means selected from the group consisting of: yarns, closed-ring-like lines, clips, rings, open rings, tweezers and hooks.

10. The kit according to claim 8, wherein said at least one body (2, 102) is equipped with at least one first passage (7) extended from said at least one cavity (5) to said side wall (4), wherein said at least one first passage (7) is a through-hole (9), a groove opened in said upper face (3), a notch (8) opened in said upper face (3) or a combination thereof.

11. The kit according to claim 8, wherein said at least one body (2, 102) is equipped with a pair of opposing passages (11; 111; 211) extended from said at least one cavity (5) to said side wall (4), wherein each of said opposing passages is a through-hole, a groove opened in said upper face, a notch opened in said upper face or a combination thereof.

12. The kit according to claim 8, wherein said at least one body is equipped with a plurality of openings (13) extended from said bottom (6) of said at least one cavity (5) to said lower face.

13. The kit according to claim 8, further comprising a second body (14; 114) removably combined with said at least one body, wherein said second body is a lid for closing/opening said at least one cavity of said at least one body and comprises a plurality of through openings (15), or wherein said second body is substantially equal to said at least one body said mold being a bivalve mold.

14. The kit according to claim 8, wherein said flexible and/or deformable material is silicone, a silicone-based material, or a rubber material.

15. The kit according to claim 8, wherein said water-sensitive mixture comprises one or more food dyes and/or sodium tetraborate.

16. The kit according to claim 8, further comprising closing and/or hooking means selected from the group consisting of: yarns, closed-ring-like lines, clips, rings, open rings, tweezers and hooks.

* * * * *